US009866464B1

(12) United States Patent
Miltenberger

(10) Patent No.: US 9,866,464 B1
(45) Date of Patent: Jan. 9, 2018

(54) TEAM NOTIFICATION ON NEW SUPPORT CASES

(71) Applicant: CA, INC., Islandia, NY (US)

(72) Inventor: Rainer Miltenberger, Hattersheim (DE)

(73) Assignee: CA, INC., New York, NY (US)

( * ) Notice: Subject to any disclaimer, the term of this patent is extended or adjusted under 35 U.S.C. 154(b) by 335 days.

(21) Appl. No.: 13/974,938

(22) Filed: Aug. 23, 2013

(51) Int. Cl.
*H04L 12/58* (2006.01)
*H04L 12/26* (2006.01)

(52) U.S. Cl.
CPC ............ *H04L 43/10* (2013.01); *H04L 51/20* (2013.01); *H04L 51/24* (2013.01)

(58) Field of Classification Search
CPC .......... H04L 43/10; H04L 51/20; H04L 51/24
See application file for complete search history.

(56) References Cited

U.S. PATENT DOCUMENTS

| 6,363,421 | B2* | 3/2002 | Barker | ............... 709/202 |
| 8,291,266 | B2* | 10/2012 | Windell | ............ G06F 11/325 |
| | | | | 709/224 |
| 2009/0327429 | A1* | 12/2009 | Hughes | ............ G06Q 10/107 |
| | | | | 709/206 |
| 2012/0072229 | A1* | 3/2012 | Zaldivar, Jr. | ........ G06Q 30/016 |
| | | | | 705/1.1 |
| 2012/0311046 | A1* | 12/2012 | Grigoriev | ............. H04W 4/12 |
| | | | | 709/206 |
| 2013/0198358 | A1* | 8/2013 | Taylor | ................ G06Q 10/00 |
| | | | | 709/223 |
| 2013/0238729 | A1* | 9/2013 | Holzman | ............. H04L 51/066 |
| | | | | 709/206 |
| 2013/0246498 | A1* | 9/2013 | Zucknovich | ........ H04L 67/2842 |
| | | | | 709/201 |
| 2014/0297663 | A1* | 10/2014 | Urago | ............. G06F 17/30699 |
| | | | | 707/754 |

* cited by examiner

*Primary Examiner* — Scott B Christensen
(74) *Attorney, Agent, or Firm* — Vierra Magen Marcus LLP

(57) ABSTRACT

Methods for automating the generation and management of notifications are described. In some embodiments, an issue tracking system may allow an end user (e.g., software support personnel) to specify the types of notifications to be generated and transmitted to the end user based on issue attributes (e.g., a corresponding product, customer identifier, or country) entered using wildcard support. The end user may subscribe to various types of notification alerts by setting personalized notification filter parameters. In some cases, the end user may use wildcard characters or regular expressions to specify the personalized notification filter parameters and specify the method of communication for the notification (e.g., to receive notifications via email). In one embodiment, once an end user takes ownership for a particular issue, then corresponding notifications that were previously sent to others may be automatically marked as taken or deleted.

20 Claims, 5 Drawing Sheets

TEAM NOTIFICATION ON NEW SUPPORT CASES

BACKGROUND

The present disclosure relates to the automated generation and management of notifications.

An issue tracking system may be used by a software vendor to track and manage customer identified issues such as software bugs and incompatibilities once software has been released from the software vendor to customers. Some issue tracking systems allow customers to enter tickets associated with software-related issues directly into the issue tracking system via a web-based user interface accessible by customers. A ticket may be created, updated, or releveled (e.g., have its priority elevated) based on customer input and/or software vendor support staff input. The issue tracking system may include a database for storing tickets, ticket histories, customer specific information (e.g., an identification of the particular software used by the customer), and resolutions to common and recently resolved software issues. Each ticket in the database may correspond with a unique ticket identifier (e.g., a reference number) and include ticket-related information such as the time the ticket was created and updated, an identification of the person responsible for creating and updating the ticket, a customer identifier associated with the ticket, a description of the issue associated with the ticket, a priority level for the ticket, and an issue status associated with the ticket (e.g., that the issue is still pending or has been resolved).

BRIEF SUMMARY

According to one aspect of the present disclosure, technology for managing user specific credentials and other identification information is disclosed.

One embodiment comprises a method comprising acquiring a set of tickets associated with an issue tracking system. The set of tickets includes a first ticket that specifies a particular issue attribute. The method further comprises acquiring a plurality of notification filters corresponding with a plurality of end users of the issue tracking system. The plurality of notification filters includes a notification filter. The notification filter includes a notification filter parameter specified using a wildcard character. The method further comprises identifying a first set of filters of the plurality of notification filters. Each filter of the first set of filters has an issue attribute match with the particular issue attribute. The notification filter parameter corresponds with the particular issue attribute. The method further comprises transmitting a first set of notifications corresponding with the first set of filters.

One embodiment comprises a system comprising a storage device and a processor in communication with the storage device. The storage device stores a ticket associated with a software-related issue. The ticket specifies a particular issue attribute. The processor acquires a plurality of notification filters corresponding with a plurality of end users. The plurality of notification filters includes a notification filter. The notification filter includes a notification filter parameter specified using a wildcard character. The processor identifies a first set of filters of the plurality of notification filters. Each filter of the first set of filters has an issue attribute match with the particular issue attribute. The notification filter parameter corresponds with the particular issue attribute. The processor causes the transmission of a first set of notifications corresponding with the first set of filters from the system.

One embodiment comprises a computer program product comprising a computer readable storage medium having computer readable program code embodied therewith. The computer readable program code configured to acquire a set of tickets associated with an issue tracking system. The set of tickets includes a first ticket that specifies a particular issue attribute. The computer readable program code configured to acquire a plurality of notification filters corresponding with a plurality of end users of the issue tracking system. The plurality of notification filters includes a notification filter. The notification filter includes a notification filter parameter specified using a wildcard character. The computer readable program code configured to identify a first set of filters of the plurality of notification filters. Each filter of the first set of filters has an issue attribute match with the particular issue attribute. The notification filter parameter corresponds with the particular issue attribute. The computer readable program code configured to cause a transmission of a first set of notifications corresponding with the first set of filters from the issue tracking system, detect that an ownership response has been received in response to the transmission of the first set of notifications, and cause a transmission of a first set of updated notifications in response to detecting the ownership response.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the Background.

BRIEF DESCRIPTION OF THE DRAWINGS

Aspects of the present disclosure are illustrated by way of example and are not limited by the accompanying figures with like references indicating like elements.

DETAILED DESCRIPTION

Figure 1:
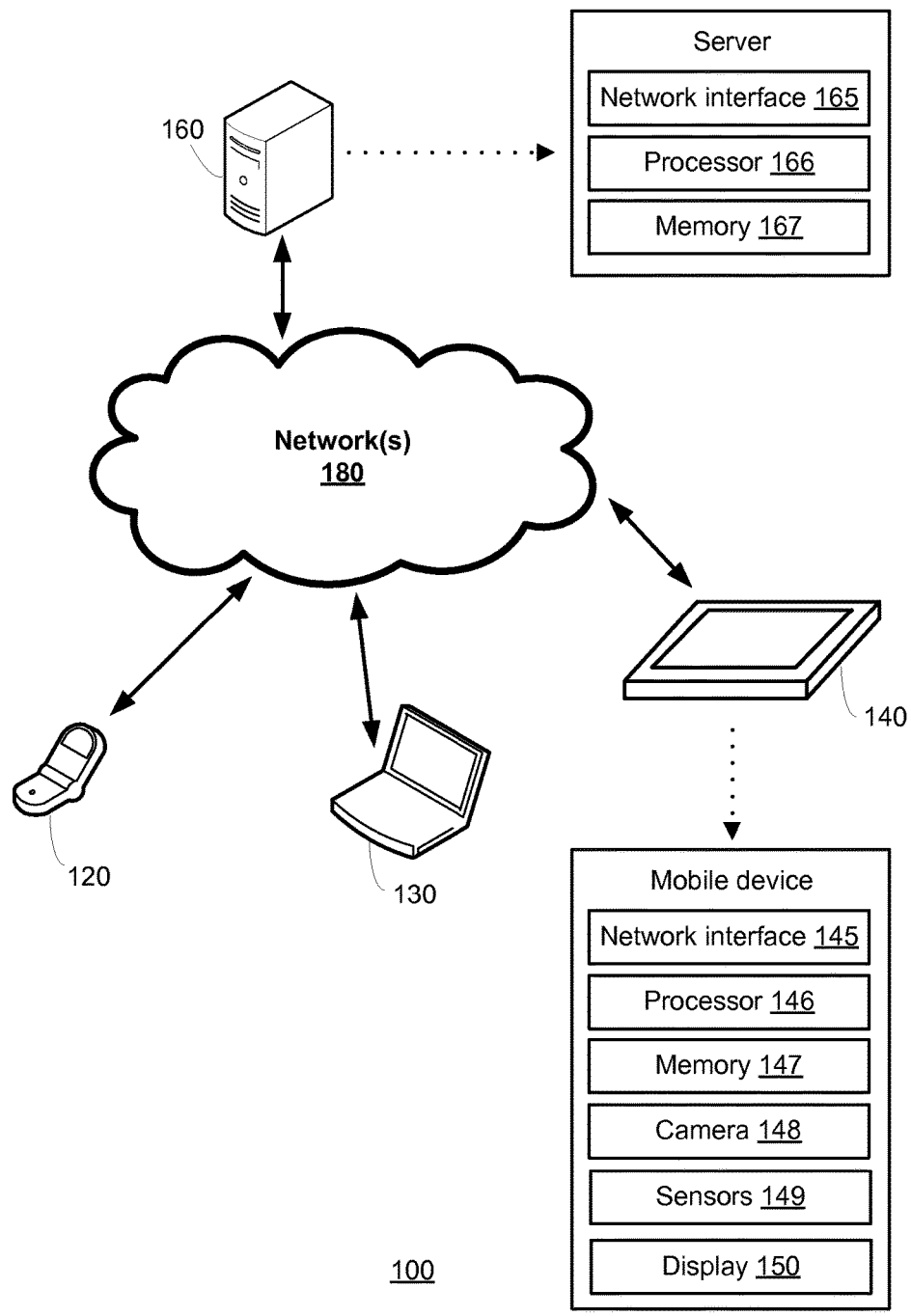
FIG. 1 depicts one embodiment of a networked computing environment.

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, microcode, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, CII, VB.NET or the like, conventional procedural programming languages, such as the "C" programming language, Visual Basic, Fortran 2003, Perl, Python, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

Technology is described for automating the generation and management of notifications. In some embodiments, an issue tracking system may allow an end user (e.g., software support personnel, software development staff, or country managers) to specify the types of notifications to be generated and transmitted to the end user based on issue attributes (e.g., a corresponding product, customer identifier, or country) entered using wildcard support (e.g., specifying one or more issue attributes using one or more wildcard characters). The end user may subscribe to various types of notification alerts by setting personalized notification filter parameters using a web-based application. In some cases, the end user may use wildcard characters or regular expressions to specify the personalized notification filter parameters (e.g., setting a plurality of products or customer identifiers using a regular expression) and specify the method of communication for the notification (e.g., to receive notifications via email, text messaging, and/or instant messaging). In one example, based on the end user's scope of work responsibility, the end user may set the personalized notification filter parameters to receive email and instant messaging notifications whenever a ticket is created for a range of products specified using wildcards for a customer based in various countries (e.g., Germany and Canada). The notifications that are generated may be sent to an identified group of end users such that a reply by one of the end users may be viewed by the entire group of end users (e.g., a reply may notify everyone in the group that ownership of the issue has been taken by one of the end users). In one embodiment, once an end user takes ownership for a particular issue (e.g., via a reply all to the group), then corresponding notifications that were previously sent to the group may be automatically marked as taken or automatically deleted from other end user's email messages, text messages, and/or instant messages.

In one embodiment, an issue tracking system may periodically identify a set of tickets (e.g., identify new and/or updated tickets every 10 minutes), acquire one or more personal notification filters corresponding with one or more end users, determine whether a first ticket of the set of tickets satisfies (or has a matching issue attribute with) a first filter of the one or more personal notification filters, determine a type of communication based on the first filter, and output a notification using the type of communication. The first filter may include one or more personalized notification filter parameters. Each of the one or more personalized notification filter parameters may be specified using wildcards. The wildcards may be matched by one or more characters in a character string. In one example, a period (.) may comprise a wildcard for a single character and a period followed by an asterisk (.*) may comprise a wildcard that will match zero or more characters. In another example, a question mark (?) may comprise a wildcard for a single character and an asterisk (*) may comprise a wildcard that will match zero or more characters. In some cases, the notification may be transmitted to a plurality of end users using different types of communication (e.g., an email message may be sent to a first end user and a text message may be sent to a second end user). After the notification has been transmitted, the issue tracking system may determine whether one of the plurality of end users has taken ownership for the first ticket within a first time period. If none of the plurality of end users has taken ownership within the first time period (e.g., within one hour of the notification being sent), then an alert notification may be transmitted to the plurality of end users warning them that ownership for the first ticket has not been taken. Thus, alert notifications for tickets that are generated any time of the day, any day of the week, or anywhere in the world may be pushed to appropriate software support personnel in real-time.

FIG. 1 depicts one embodiment of a networked computing environment 100 in which the disclosed technology may be practiced. Networked computing environment 100 includes a plurality of computing devices interconnected through one or more networks 180. The one or more networks 180 allow a particular computing device to connect to and communicate with another computing device. The depicted computing devices include mobile device 120, mobile device 130, mobile device 140, and server 160. In some embodiments, the plurality of computing devices may include other computing devices not shown. A computing device may comprise various computing devices such as a mobile phone, laptop computer, desktop computer, or tablet computer. In some embodiments, the plurality of computing devices may include more than or less than the number of computing devices shown in FIG. 1. The one or more networks 180 may include a secure network such as an enterprise private network, an unsecure network such as a wireless open network, a local area network (LAN), a wide area network (WAN), and the Internet. Each network of the one or more networks 180 may include hubs, bridges, routers, switches, and wired transmission media such as a wired network or direct-wired connection.

A server, such as server 160, may allow a client to download information (e.g., text, audio, image, and video files) from the server or to perform a search query related to particular information stored on the server. In general, a "server" may include a hardware device that acts as the host in a client-server relationship or a software process that shares a resource with or performs work for one or more clients. Communication between computing devices in a client-server relationship may be initiated by a client sending a request to the server asking for access to a particular resource or for particular work to be performed. The server may subsequently perform the actions requested and send a response back to the client.

One embodiment of server 160 includes a network interface 165, processor 166, and memory 167, all in communication with each other. Network interface 165 allows server 160 to connect to one or more networks 180. Network interface 165 may include a wireless network interface, a modem, and/or a wired network interface. Processor 166 allows server 160 to execute computer readable instructions stored in memory 167 in order to perform processes discussed herein.

One embodiment of mobile device 140 includes a network interface 145, processor 146, memory 147, camera 148, sensors 149, and display 150, all in communication with each other. Network interface 145 allows mobile device 140 to connect to one or more networks 180. Network interface 145 may include a wireless network interface, a modem, and/or a wired network interface. Processor 146 allows mobile device 140 to execute computer readable instructions stored in memory 147 in order to perform processes discussed herein. Camera 148 may capture images or video. Sensors 149 may generate motion and/or orientation information associated with mobile device 140. Sensors 149 may comprise an inertial measurement unit (IMU). Display 150 may display digital images and/or videos. Display 150 may comprise a touchscreen display.

In some embodiments, various components of mobile device 140 including the network interface 145, processor 146, memory 147, camera 148, and sensors 149 may be integrated on a single chip substrate. In one example, the network interface 145, processor 146, memory 147, camera 148, and sensors 149 may be integrated as a system on a chip (SOC). In other embodiments, the network interface 145, processor 146, memory 147, camera 148, and sensors 149 may be integrated within a single package.

In some embodiments, mobile device 140 may provide a natural user interface (NUI) by employing camera 148, sensors 149, and gesture recognition software running on processor 146. With a natural user interface, a person's body parts and movements may be detected, interpreted, and used to control various aspects of a computing application. In one example, a computing device utilizing a natural user interface may infer the intent of a person interacting with the computing device (e.g., that the end user has performed a particular gesture in order to control the computing device).

Networked computing environment 100 may provide a cloud computing environment for one or more computing devices. Cloud computing refers to Internet-based computing, wherein shared resources, software, and/or information are provided to one or more computing devices on-demand via the Internet (or other global network). The term "cloud" is used as a metaphor for the Internet, based on the cloud drawings used in computer networking diagrams to depict the Internet as an abstraction of the underlying infrastructure it represents.

In some embodiments, a mobile device, such as mobile device 140, may be in communication with a server in the cloud, such as server 160, and may provide to the server authentication information (e.g., a password associated with an end user of the mobile device) and/or user identification information (e.g., an alphanumeric user identifier) associated with the end user. In response, the server may transmit to the mobile device security protected data accessible by the end user. In one embodiment, the authentication information may be automatically determined by the mobile device based on biometric characteristics of the end user. In another embodiment, the authentication information may be automatically determined by the mobile device based on the identification of various biometric characteristics of the end user, as well as the detection of various gestures performed by the end user, and other factors such as the location of the mobile device.

In one embodiment, a mobile device, such as mobile device 140, may be in communication with a server in the cloud running an issue tracking application. The issue tracking application may periodically identify a set of new tickets, acquire one or more personal notification filters corresponding with one or more end users of the issue tracking application, determine whether a first ticket of the set of new tickets matches a first filter of the one or more personal notification filters, determine a type of communication based on the first filter, and output a notification using the type of communication to the mobile device 140 (e.g., by transmitting the notification to the mobile device via an email message or instant message). After the notification has been transmitted, the issue tracking application may determine whether one of a plurality of end users of the issue tracking application has taken ownership for the first ticket within a first time period. If none of the plurality of end users has taken ownership within the first time period (e.g., within two hours of the notification being sent), then an alert notification may be transmitted to the plurality of end users warning them that ownership for the first ticket has not been taken within the first time period. In some cases, an alert notification may be transmitted to the plurality of end users if there is less than a particular period of time until a response expiration time and no one has taken ownership for the first ticket. For example, if a service level object requires that responses to a customer associated with the first ticket must be made within two hours, then an alert notification may be transmitted if there is less than 15 minutes to go prior to the two hour deadline.

Figure 2:
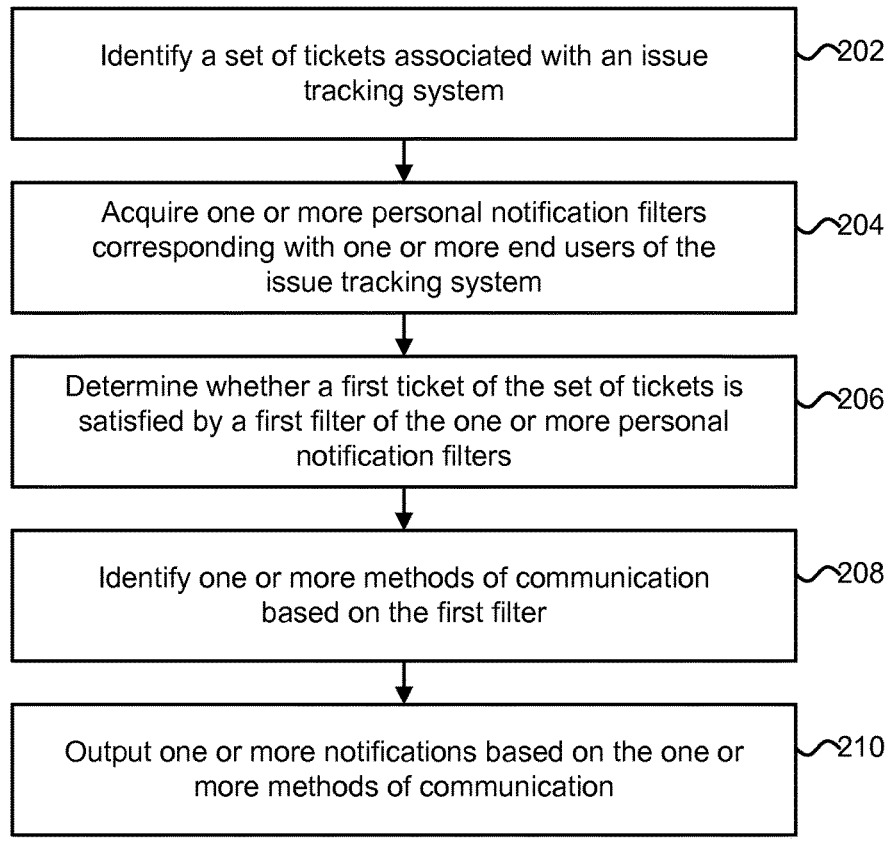
FIG. 2 is a flowchart describing one embodiment of a process for generating notifications.

FIG. 2 is a flowchart describing one embodiment of a process for generating notifications. In one embodiment, the process of FIG. 2 is performed by a server, such as server 160 in FIG. 1.

In step 202, a set of tickets associated with an issue tracking system is identified. The set of tickets may include new tickets (e.g., tickets that have been entered into the issue tracking system by a customer within a recent time period such as the last minute or hour), updated tickets (e.g., tickets that have been releveled or reprioritized by software support personnel using the issue tracking system), and/or tickets with a pending status (e.g., tickets associated with issues that have not been closed or completed). Each ticket of the set of tickets may include a ticket identifier (e.g., a reference number) and include ticket-related information such as the time the ticket was created and updated, an identification of the person or party responsible for creating and updating the ticket, a customer identifier associated with the ticket, a description of the issue associated with the ticket, a priority level for the ticket, an issue status associated with the ticket, a product associated with the ticket (e.g., a software name and version), and a country associated with the ticket (e.g., a country where the customer associated with a customer identifier resides or is based).

In step 204, one or more personal notification filters corresponding with one or more end users of the issue tracking system are acquired. In one embodiment, the issue tracking system may generate personalized notifications for various end users (e.g., employees of a software vendor such as software support personnel, software development staff, and country managers). In one example, each of the various end users may subscribe to various types of notification alerts by setting personalized notification filter parameters using a web-based application. Each of the personalized notification filter parameters may correspond with an issue attribute specified by a ticket (e.g., a corresponding product, customer identifier, or country). The end users may use wildcard characters or regular expressions to specify the personalized notification filter parameters. In one example, an end user of the issue tracking system may use one or more wildcard characters when specifying one or more products, one or more countries, and/or one or more customer identifiers for which an alert notification should be transmitted to the end user. The end user may also specify the method of notification (e.g., to receive notifications via e-mail message, text message, voice message, and/or instant message).

In step 206, it is determined whether a first ticket of the set of tickets is satisfied by a first filter of the one or more personal notification filters. The first filter may include one or more personalized notification filter parameters corresponding with one or more issue attributes. Each of the one or more personalized notification filter parameters may be specified using wildcards. In one example, a range of products may be specified using a wildcard character that may be matched by one or more characters (e.g., CLA* may match with CLA100 or CLAW). One embodiment of a process for determining whether a notification filter is satisfied by a ticket is described later in reference to FIG. 4.

In step 208, one or more methods of communication are identified based on the first filter. The methods of communication may comprise various forms of electronic communications including email messaging, text messaging, and/or instant messaging. In some cases, an end user may receive a notification corresponding with a particular ticket via a plurality of different methods of electronic communication. In one embodiment, the method of electronic communication may depend on a time of day or a location of the end user. In one example, during daytime work hours an end user may specify that an instant message be used as the specified form of electronic communication, while during nighttime hours the end user may specify that an email message be sent to provide the notification to the end user. In another example, if the end user is located outside of a particular country, then email messaging may be determined to be the method of electronic communication.

In step 210, one or more notifications are outputted based on the one or more methods of communication. In one embodiment, the one or more notifications may be transmitted to a mobile device associated with the end user. In some cases, a first notification of the one or more notifications may be transmitted to the end user via an instant message and a text message and a second notification of the one or more notifications may be transmitted to the end user via an email message. In some cases, a single email and/or a single instant message may be sent to a plurality of end users.

In one embodiment, an issue tracking application may periodically identify a set of new and/or updated tickets (e.g., every 15 minutes), acquire a notification filter corresponding with the end user of the issue tracking application, determine whether a first ticket of the set of new and/or updated tickets is satisfied by the notification filter, and transmit a notification to the end user via an electronic communication (e.g., an email message or instant message). After the notification has been transmitted, the issue tracking application may determine whether one of a plurality of end users of the issue tracking application has taken ownership for the first ticket within a first time period. If none of the plurality of end users has taken ownership within the first time period (e.g., within 30 minutes of the notification being sent), then an alert notification may be transmitted to the plurality of end users warning them that ownership for the first ticket has not been taken within the first time period.

Figure 3:
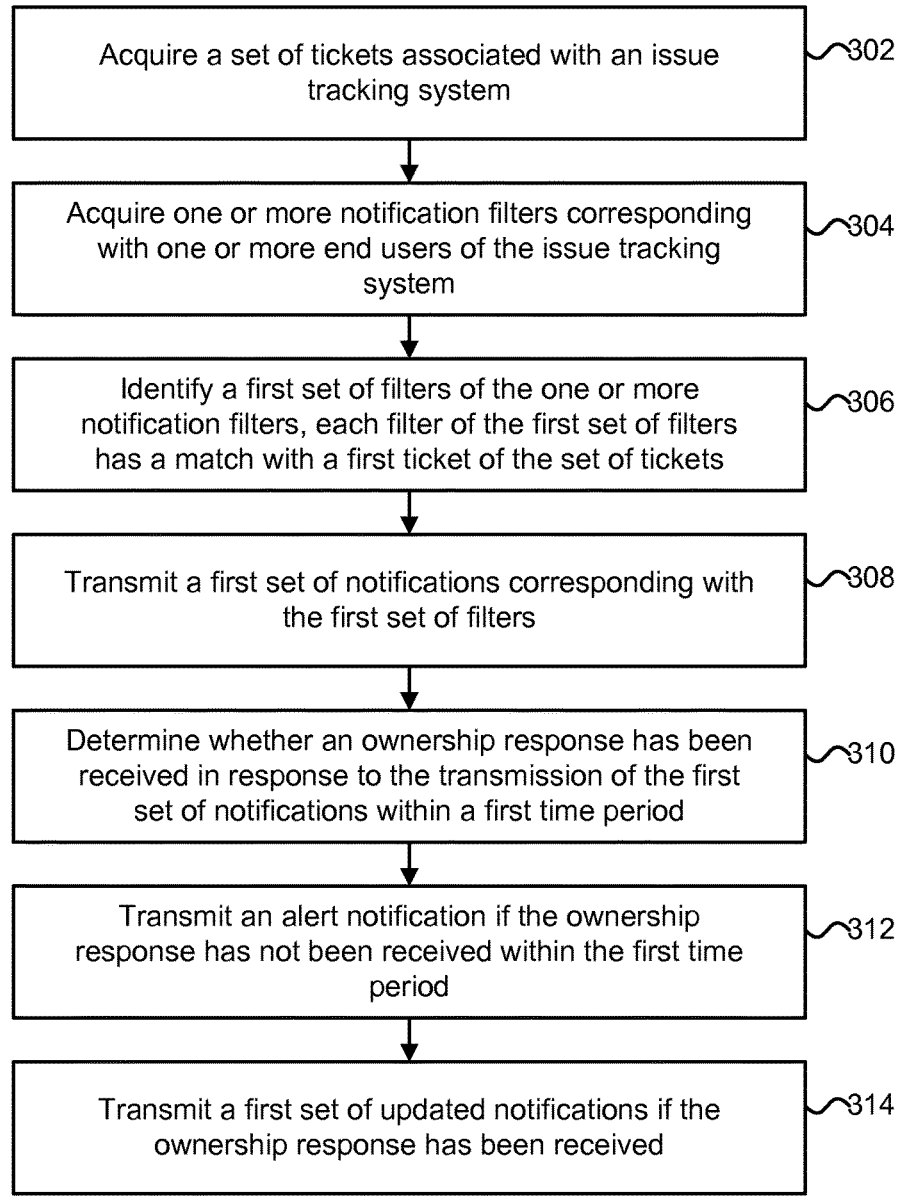
FIG. 3 is a flowchart describing one embodiment of a process for managing notifications.

FIG. 3 is a flowchart describing one embodiment of a process for managing notifications. In one embodiment, the process of FIG. 3 is performed by a server, such as server 160 in FIG. 1.

In step 302, a set of tickets associated with an issue tracking system is identified. The set of tickets may include new tickets and/or recently updated tickets. Each ticket of the set of tickets may include a ticket identifier and include ticket-related information such as the time the ticket was created and updated, an identification of the person or party responsible for creating or updating the ticket, a customer identifier associated with the ticket, a description of the issue associated with the ticket, a priority level for the ticket, an issue status associated with the ticket, a product associated with the ticket, and a country associated with the ticket.

In step 304, one or more notification filters corresponding with one or more end users of the issue tracking system are acquired. In one embodiment, the issue tracking system may generate notifications for a plurality of end users (e.g., employees of a software vendor such as software support personnel, software development staff, and country managers). In one example, each of the various end users may subscribe to various types of notification alerts by setting notification filter parameters (e.g., via a web-based application). Each of the notification filter parameters may correspond with an issue attribute specified by a ticket (e.g., a corresponding product, customer identifier, or country). The end users may use wildcard characters or regular expressions to specify the notification filter parameters. In one example, an end user of the issue tracking system may use one or more wildcard characters when specifying one or more products, one or more countries, and/or one or more customer identifiers for which an alert notification should be transmitted to the end user. The end user may also specify the method of electronic communication (e.g., to receive notifications via e-mail message, text message, voice message, and/or instant message).

In some embodiments, an end user may view a set of notification filters currently associated with the end user for application by an issue tracking system using a web-based application. The end user may add new filters to the set of notification filters and update and/or delete any of the set of notification filters using the web-based application.

In step 306, a first set of filters of the one or more notification filters is identified. Each filter of the first set of filters may have a match with a first ticket of the set of tickets (e.g., each filter of the first set of filters may have a matching issue attribute with the issue attributes specified within the first ticket). In one example, a first filter of the first set of filters may have a first matching issue attribute with the first ticket (e.g., a product match) and a second filter of the first set of filters may have a second matching issue attribute with the first ticket (e.g., a customer match). In some cases, a range of products and/or a range of customer identifiers may be specified using one or more wildcard characters. One embodiment of a process for determining whether a notification filter is satisfied by a ticket is described later in reference to FIG. 4.

In step 308, a first set of notifications corresponding with the first set of filters is transmitted. In one embodiment, the first set of notifications may comprise a plurality of notifications. The first set of notifications may be transmitted via various forms of electronic communication, such as instant messaging or text messaging. The first set of notifications may be transmitted from a server, such as server 160 in FIG. 1, running an issue tracking application.

In one embodiment, a first notification of the first set of notifications may be received by a first end user via an instant message. In some cases, a response to the first notification may cause the first end user to enter into a group chat with other end users (e.g., other software support personnel) associated with the first set of notifications.

In step 310, it is determined whether an ownership response has been received in response to the transmission of the first set of notifications within a first time period. In one embodiment, an end user corresponding with one of the first set of notifications may transmit an ownership response or other communication signifying that the end user has taken responsibility for the first ticket. In some cases, the end user may reply to an instant message or email message that has been transmitted to various end users corresponding with the first set of notifications.

In step 312, an alert notification is transmitted if the ownership response has not been received within the first period of time. The alert notification may comprise an email message, text message, instant message, or other form of electronic communication. In one embodiment, if an ownership response is not been received within one hour, then an email message with a high priority level may be transmitted to key stakeholders associated with the first ticket. In another embodiment, if the ownership response has not been received within 30 minutes, then the first set of notifications may be retransmitted to the various end users corresponding with the first set of notifications.

In step 314, a first set of updated notifications is transmitted if the ownership response has been received. In one embodiment, once an end user takes ownership for the first ticket (e.g., via a reply all to the group or a response transmitted to an issue tracking application), then corresponding notifications that were previously transmitted to the various end users corresponding with the first set of notifications may be automatically marked as taken or automatically deleted from email messages, text messages, and/or instant messages. In some cases, an end user of an issue tracking system may specify (e.g., within a personalized notification filter) whether an update notification causes a corresponding earlier received notification to be deleted or marked as completed within their computing environment.

Figure 4:
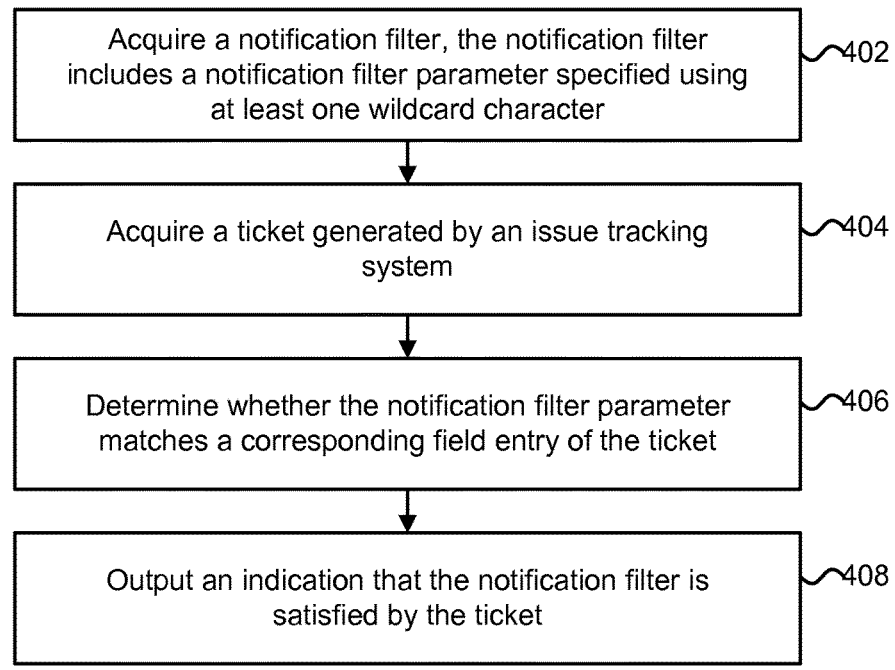
FIG. 4 is a flowchart describing one embodiment of a process for determining whether a notification filter is satisfied by a ticket.

FIG. 4 is a flowchart describing one embodiment of a process for determining whether a notification filter is satisfied by a ticket. The process described in FIG. 4 is one example of a process for implementing step 206 in FIG. 2 or for implementing step 306 in FIG. 3. In one embodiment, the process of FIG. 4 is performed by a server, such as server 160 in FIG. 1.

In step 402, a notification filter is acquired. The notification filter may include a notification filter parameter specified using at least one wildcard character. In one example, the notification filter parameter may correspond with a customer identifier or a plurality of customer identifiers as specified using a wildcard character (e.g., *system* or Micro*). In another example, the notification filter parameter may correspond with a plurality of products as specified using one or more wildcard characters (e.g., CLA* may match products associated with product identifiers CLA100, CLA200, and CLA300).

In step 404, a ticket generated by an issue tracking system is acquired. The ticket may be associated with a particular software-related issue and entered by a particular customer into the issue tracking system. In step 406, it is determined whether the notification filter parameter matches a corresponding field entry of the ticket. The field entry may be associated with a particular issue attribute (e.g., a product or customer). In one embodiment, string matching using wildcards may be performed to find a match between the notification filter parameter and a corresponding field entry of the ticket. In step 408, an indication that the notification filter is or has been satisfied by the ticket is outputted.

Figure 5:
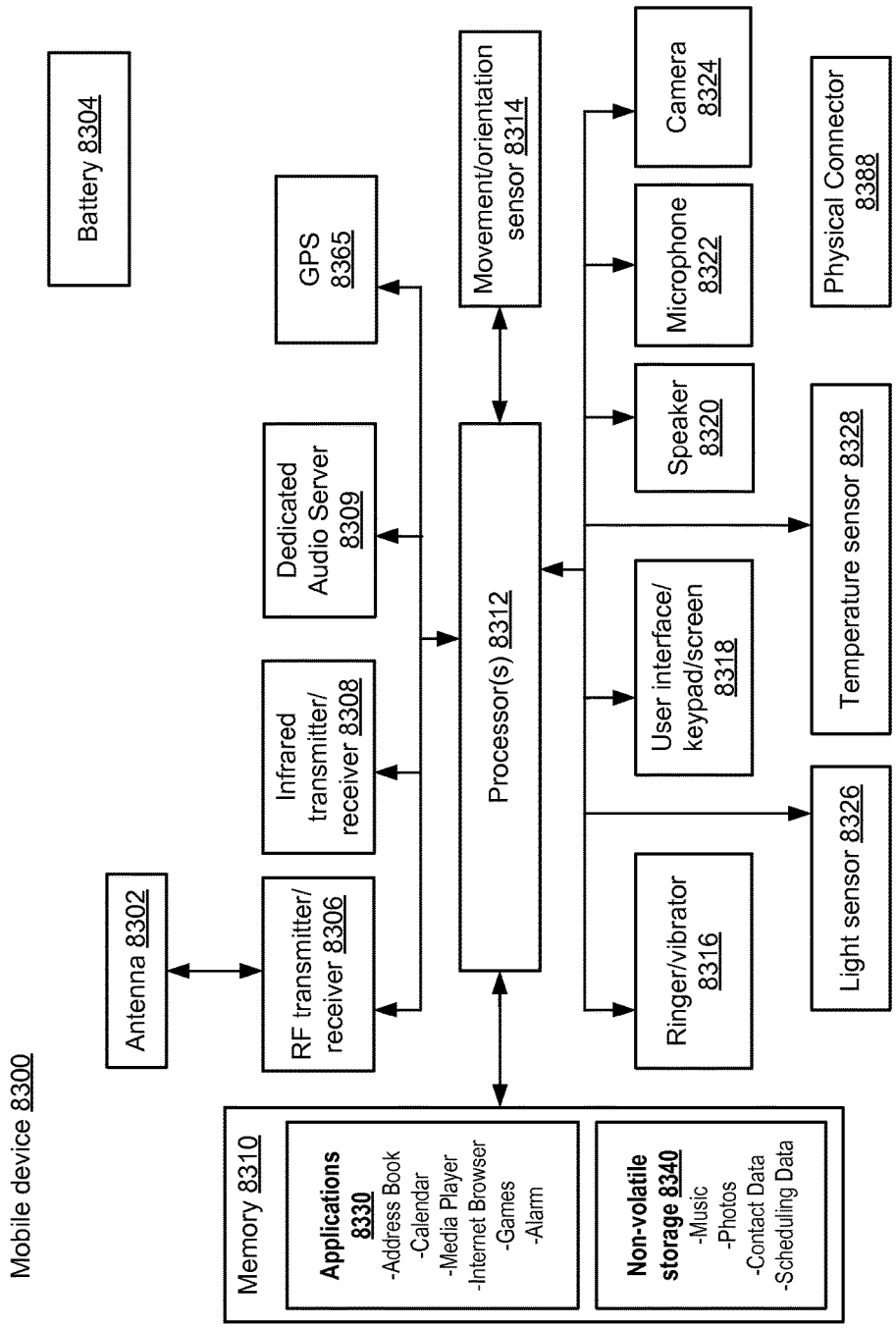
FIG. 5 depicts one embodiment of a mobile device.

The disclosed technology may be used with various computing systems. FIG. 5 depicts one embodiment of a mobile device 8300, which includes one example of a mobile implementation for mobile device 140 in FIG. 1. Mobile devices may include laptop computers, pocket computers, mobile phones, personal digital assistants, tablet computers, and handheld media devices that have been integrated with wireless receiver/transmitter technology.

Mobile device 8300 includes one or more processors 8312 and memory 8310. Memory 8310 includes applications 8330 and non-volatile storage 8340. Memory 8310 can be any variety of memory storage media types, including non-volatile and volatile memory. A mobile device operating system handles the different operations of the mobile device 8300 and may contain user interfaces for operations, such as placing and receiving phone calls, text messaging, checking voicemail, and the like. The applications 8330 can be any assortment of programs, such as a camera application for photos and/or videos, an address book, a calendar application, a media player, an internet browser, games, an alarm application, and other applications. The non-volatile storage component 8340 in memory 8310 may contain data such as music, photos, contact data, scheduling data, and other files.

The one or more processors 8312 also communicates with dedicated audio server 8309, with RF transmitter/receiver 8306 which in turn is coupled to an antenna 8302, with infrared transmitter/receiver 8308, with global positioning service (GPS) receiver 8365, and with movement/orientation sensor 8314 which may include an accelerometer and/or magnetometer. RF transmitter/receiver 8308 may enable wireless communication via various wireless technology standards such as Bluetooth® or the IEEE 802.11 standards. Accelerometers have been incorporated into mobile devices to enable applications such as intelligent user interface applications that let users input commands through gestures, and orientation applications which can automatically change the display from portrait to landscape when the mobile device is rotated. An accelerometer can be provided, e.g., by a micro-electromechanical system (MEMS) which is a tiny mechanical device (of micrometer dimensions) built onto a semiconductor chip. Acceleration direction, as well as orientation, vibration, and shock can be sensed. The one or more processors 8312 further communicate with a ringer/vibrator 8316, a user interface keypad/screen 8318, a speaker 8320, a microphone 8322, a camera 8324, a light sensor 8326, and a temperature sensor 8328. The user interface keypad/screen may include a touch-sensitive screen display.

The one or more processors 8312 controls transmission and reception of wireless signals. During a transmission mode, the one or more processors 8312 provide voice signals from microphone 8322, or other data signals, to the RF transmitter/receiver 8306. The transmitter/receiver 8306 transmits the signals through the antenna 8302. The ringer/vibrator 8316 is used to signal an incoming call, text message, calendar reminder, alarm clock reminder, or other notification to the user. During a receiving mode, the RF transmitter/receiver 8306 receives a voice signal or data signal from a remote station through the antenna 8302. A received voice signal is provided to the speaker 8320 while other received data signals are processed appropriately.

Additionally, a physical connector 8388 may be used to connect the mobile device 8300 to an external power source, such as an AC adapter or powered docking station, in order to recharge battery 8304. The physical connector 8388 may also be used as a data connection to an external computing device. For example, the data connection may allow for operations such as synchronizing mobile device data with the computing data on another device.

The flowchart and block diagrams in the Figures illustrate the architecture, functionality, and operation of possible implementations of systems, methods and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

For purposes of this document, each process associated with the disclosed technology may be performed continuously and by one or more computing devices. Each step in a process may be performed by the same or different computing devices as those used in other steps, and each step need not necessarily be performed by a single computing device.

For purposes of this document, reference in the specification to "an embodiment," "one embodiment," "some embodiments," or "another embodiment" are used to described different embodiments and do not necessarily refer to the same embodiment.

For purposes of this document, a connection can be a direct connection or an indirect connection (e.g., via another part).

For purposes of this document, the term "set" of objects, refers to a "set" of one or more of the objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for automating the generation of notifications, comprising:
    acquiring a set of tickets associated with an issue tracking system, the set of tickets includes a first ticket that specifies a particular issue attribute;
    acquiring a plurality of notification filters corresponding with a plurality of end users of the issue tracking system;
    identifying a first set of filters of the plurality of notification filters associated with a first set of end users, each filter of the first set of filters has an issue attribute match with the particular issue attribute;
    transmitting a first set of notifications corresponding with the first set of filters to the first set of end users of the plurality of end users, the transmitting the first set of notifications includes transmitting a first notification of a first type of electronic communication to a first end user of the plurality of end users and a second notification of a second type of electronic communication different from the first type of electronic communication to a second end user of the plurality of end users;
    detecting that an ownership response has been received within a first period of time subsequent to the transmission of the first set of notifications, the detecting that the ownership response has been received within the first period of time includes detecting that a reply all message of the first type of electronic communication has been received from the first end user within the first period of time;
    determining a first set of updated notifications including determining for each notification of the first set of notifications whether to delete or mark as completed the notification using the first set of filters associated with the first set of end users; and
    transmitting the first set of updated notifications to the first set of end users in response to the ownership response being received within the first period of time, the transmitting the first set of updated notifications causes a subset of the first set of notifications to be marked as completed and causes the first notification of the first type of electronic communication transmitted to the first end user and the second notification of the second type of electronic communication different from the first type of electronic communication transmitted to the second end user to be automatically deleted.

2. The method of claim 1, wherein:
    the transmitting the first set of updated notifications causes a first email message corresponding with the first notification of the first set of notifications transmitted to the first end user of the first set of end users to be automatically deleted.

3. The method of claim 2, wherein:
    the transmitting the first set of updated notifications causes a second text message corresponding with the second notification of the first set of notifications transmitted to the second end user of the first set of end users to be automatically deleted.

4. The method of claim 1, further comprising:
    transmitting an alert notification if the ownership response has not been received within a second period of time less than the first period of time.

5. The method of claim 1, further comprising:
    determining a location of the first end user of the first set of end users; and
    determining the first notification of the first type of electronic communication based on the location of the first end user.

6. The method of claim 5, wherein:
    the particular issue attribute corresponds with a product; and
    the first notification of the first type of electronic communication comprises an email message if the first end user is located outside of a particular country and the first notification of the first type of electronic communication comprises a text message if the first end user is located inside the particular country.

7. The method of claim 1, further comprising:
    identifying a plurality of electronic communication types associated with the plurality of notification filters, the transmitting the first set of notifications includes transmitting the first set of notifications based on the plurality of electronic communication types.

8. The method of claim 7, wherein:
    the plurality of electronic communication types includes instant messaging.

9. The method of claim 1, wherein:
    the first notification of the first type of electronic communication comprises an email message and the second notification of the second type of electronic communication comprises a text message.

10. The method of claim 1, wherein:
    the first type of electronic communication comprises instant messaging.

11. The method of claim 1, wherein:
    the first type of electronic communication comprises text messaging.

12. A system, comprising:
    a storage device configured to store a ticket associated with a software-related issue, the ticket specifies a particular issue attribute; and
    a processor in communication with the storage device, the processor configured to acquire a plurality of notification filters corresponding with a plurality of end users, the processor configured to identify a first set of filters of the plurality of notification filters associated with a first set of end users, each filter of the first set of filters has an issue attribute match with the particular issue attribute, the processor configured to cause a first set of notifications corresponding with the first set of filters to be transmitted to the first set of end users of the plurality of end users from the system, the first set of notifications includes a first notification of a first type of electronic communication transmitted to a first end user of the plurality of end users and a second notification of a second type of electronic communication different from the first type of electronic communication transmitted to a second end user of the plurality of end users, the processor configured to detect that an ownership response has been received within a first period of time subsequent to the transmission of the first set of notifications, the ownership response comprises a reply all message of the first type of electronic communication from the first end user, the processor configured to determine a first set of updated notifications and determine for each notification of the first set of notifications whether to delete or mark as completed the notification using the first set of filters associated with the first set of end users, the processor configured to cause the first set of updated notifications to be transmitted to the first set of end users in response to the ownership response being received within the first period of time, the transmission of the first set of updated notifications causes a subset of the first set of notifications to be marked as completed, the transmission of the first set of updated notifications causes the first notification of the first type of electronic communication and the second notification of the second type of electronic communication different from the first type of electronic communication to be automatically deleted.

13. The system of claim 12, wherein:

the transmission of the first set of updated notifications causes a first email message corresponding with the first notification of the first set of notifications transmitted to the first end user of the first set of end users to be automatically deleted.

14. The system of claim 13, wherein:

the transmission of the first set of updated notifications causes a second instant message corresponding with the second notification of the first set of notifications transmitted to the second end user of the first set of end users to be automatically deleted.

15. The system of claim 12, wherein:

the processor configured to determine a location of the first end user of the first set of end users and determine the first notification of the first type of electronic communication based on the location of the first end user.

16. The system of claim 12, wherein:

the particular issue attribute corresponds with a product, the first notification of the first type of electronic communication comprises an email message and the second notification of the second type of electronic communication comprises a text message.

17. A computer program product, comprising:

a non-transitory computer readable storage medium having computer readable program code embodied therewith, the computer readable program code comprising:

computer readable program code configured to acquire a set of tickets associated with an issue tracking system, the set of tickets includes a first ticket that specifies a particular issue attribute;

computer readable program code configured to acquire a plurality of notification filters corresponding with a plurality of end users of the issue tracking system;

computer readable program code configured to identify a first set of filters of the plurality of notification filters associated with a first set of end users, each filter of the first set of filters has an issue attribute match with the particular issue attribute;

computer readable program code configured to cause a transmission of a first set of notifications corresponding with the first set of filters to the first set of end users of the plurality of end users from the issue tracking system, the first set of notifications includes a first notification of a first type of electronic communication transmitted to a first end user of the plurality of end users and a second notification of a second type of electronic communication different from the first type of electronic communication transmitted to a second end user of the plurality of end users;

computer readable program code configured to detect that an ownership response has been received within a first period of time subsequent to the transmission of the first set of notifications, the ownership response comprises a reply all message of the first type of electronic communication from the first end user;

computer readable program code configured to determine a first set of updated notifications that includes a determination for each notification of the first set of notifications whether to delete or mark as completed the notification using the first set of filters associated with the first set of end users; and computer readable program code configured to cause a transmission of the first set of updated notifications to the first set of end users in response to detecting that the ownership response has been received within the first period of time, the transmission of the first set of updated notifications causes a subset of the first set of notifications to be marked as completed and causes the first notification of the first type of electronic communication and the second notification of the second type of electronic communication different from the first type of electronic communication to be automatically deleted.

18. The computer program product of claim 17, wherein:

the first notification of the first type of electronic communication comprises an email message and the second notification of the second type of electronic communication comprises a text message.

19. The computer program product of claim 17, wherein:

the particular issue attribute corresponds with a customer identifier; and the first notification of the first type of electronic communication is determined based on a location of the first end user.

20. The computer program product of claim 17, wherein:

the first notification of the first type of electronic communication comprises an email message if the first end user is located outside of a particular country and the first notification of the first type of electronic communication comprises a text message if the first end user is located inside the particular country.

* * * * *